US012638630B2

(12) United States Patent
Marshall

(10) Patent No.: US 12,638,630 B2
(45) Date of Patent: May 26, 2026

(54) WAVEGUIDE

(71) Applicant: BAE SYSTEMS plc, London (GB)

(72) Inventor: Ian Marshall, Rochester (GB)

(73) Assignee: BAE SYSTEMS PLC, London (GB)

( * ) Notice: Subject to any disclaimer, the term of this patent is extended or adjusted under 35 U.S.C. 154(b) by 293 days.

(21) Appl. No.: 18/560,732

(22) PCT Filed: May 9, 2022

(86) PCT No.: PCT/GB2022/051172
§ 371 (c)(1),
(2) Date: Nov. 14, 2023

(87) PCT Pub. No.: WO2022/238688
PCT Pub. Date: Nov. 17, 2022

(65) Prior Publication Data
US 2024/0255687 A1     Aug. 1, 2024

(30) Foreign Application Priority Data

May 14, 2021     (EP) ..................................... 21275058
May 14, 2021     (GB) ..................................... 2106911

(51) Int. Cl.
*F21V 8/00*          (2006.01)
*G02B 1/12*          (2006.01)
*G02B 27/01*        (2006.01)

(52) U.S. Cl.
CPC ............. *G02B 6/0016* (2013.01); *G02B 1/12* (2013.01); *G02B 6/0018* (2013.01); *G02B 6/0055* (2013.01); *G02B 27/0172* (2013.01)

(58) Field of Classification Search
CPC ...... G02B 6/00; G02B 6/0035; G02B 6/0016; G02B 6/0018; G02B 6/0055; G02B 6/0076; G02B 1/12; G02B 27/01; G02B 27/0178; G02B 27/0179; G02B 27/283; G02B 27/42; G02B 27/46; G02B 27/48; G02B 5/18;
(Continued)

(56) References Cited

U.S. PATENT DOCUMENTS 8,432,614 B2     4/2013   Amitai
10,481,319 B2 *  11/2019  Danziger ........... G02B 27/0081
(Continued)

FOREIGN PATENT DOCUMENTS

CN           110161612  A      8/2019
WO            0195027  A2     12/2001
(Continued)

OTHER PUBLICATIONS

International Search Report and Written Opinion received for PCT/GB2022/051172. Mailed: Jun. 20, 2022. 14 pages.
(Continued)

*Primary Examiner* — Jie Lei
(74) *Attorney, Agent, or Firm* — Arcane Law PLLC

(57) ABSTRACT

A waveguide for use in a head-up or head-worn display, the waveguide comprising: a prism having an entrance pupil for receiving an image; a plurality of gratings configured to direct illumination through the prism towards first and second semi-reflecting surfaces; wherein the semi-reflecting surfaces each reflect a different amount of illumination towards an exit point to produce an output image.

18 Claims, 4 Drawing Sheets

(58) Field of Classification Search
CPC .. G02B 5/1819; G02B 5/1814; G02B 5/1842;
G02B 5/1866; G02B 5/3083
USPC ...... 359/34, 569, 563, 489.07, 558, 566, 13,
359/630–633; 385/11, 31, 37
See application file for complete search history.

(56) References Cited

U.S. PATENT DOCUMENTS

| | | | |
|---|---|---|---|
| 2003/0165017 A1* | 9/2003 | Amitai ............... | G02B 27/0172 |
| | | | 359/636 |
| 2008/0278812 A1 | 11/2008 | Amtai | |
| 2015/0086163 A1 | 3/2015 | Valera et al. | |
| 2016/0116739 A1* | 4/2016 | TeKolste ................ | G02B 6/005 |
| 2019/0155027 A1 | 5/2019 | Marshall | |

FOREIGN PATENT DOCUMENTS

| | | | |
|---|---|---|---|
| WO | 2007054928 A1 | 5/2007 | |
| WO | 2018150163 A1 | 8/2018 | |
| WO | 2022238688 A1 | 11/2022 | |

OTHER PUBLICATIONS

Extended European Search Report received for EP Application No. 21275058.2, dated Oct. 20, 2021. 9 pages.
Combined Search and Examination Report under Sections 17 and 18(3) received for GB Application No. 2106911.7, dated Feb. 14, 2022. 9 pages.

* cited by examiner

WAVEGUIDE

TECHNICAL FIELD

The present invention relates to an improved waveguide, particularly an enhanced prismatic waveguide.

BACKGROUND

One dimensional (1D) waveguides are known to offer an inexpensive waveguide suitable for use in a head mounted display (HMD), a head worn device (HWD) or the like. Most 1D waveguides utilise holograms which can lead to optical problems. A 1D waveguide which does not use holograms would be useful.

Such designs are feasible but have led to several disadvantages. These include reflections that are achromatic and create sharp edges. Also, as the pupils overlap from different parts of the ray paths, one pupil has a sharp boundary in the pupil illumination and thus pupil banding becomes a limiting factor.

By way of comparison, the diffraction process used in many waveguides spreads even a narrow band source, to soften the edges of pupil structure.

There is therefore a need incorporate diffractive processes into the 1D waveguides to obtain an inexpensive waveguide which overcomes the problems of 1D waveguides that do not use holograms.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the invention there is provided a waveguide (100) for use in display system, the waveguide comprising: a prism (102) having an entrance pupil for receiving an image; a plurality of gratings (106, 108) configured to direct illumination through the prism towards first and second semi-reflecting surfaces (114, 116); wherein the semi-reflecting surfaces (114, 116) each reflect a different amount of illumination towards an exit point (118) to produce an output image.

The waveguide including the first semi-reflecting surface (114) being formed at a junction between the prism (102) and a first make-up piece (110).

The waveguide including the second semi-reflecting surface (116) being formed at a junction between the first make-up piece (110) and a second make-up piece (112).

The waveguide including the first make-up piece (110) and the second make-up piece (112) are made from glass.

The waveguide including the make-up pieces (110, 112) being configured to be cemented in place.

The waveguide including the cement that causes the semi-reflecting surfaces (114, 116) to reflect the illumination.

The waveguide including first and second make-up pieces (110, 112) being configured to be coated with a coating that reacts with the cement to cause the reflection.

The waveguide including the semi-reflecting surfaces (114, 116) being configured to reflect about 10% of the illumination and transmit about 90% along the waveguide.

The waveguide including the prism (102) being a prismatic one dimensional, 1D, prism.

The waveguide including the prism (102) being made of glass.

The waveguide including the waveguide being configured for the illumination to undergo total internal reflection within the prism (102).

The waveguide including the diffraction gratings (106, 108) comprising a structure that is configured to cause diffraction within the waveguide such that an optical field is modulated in the prism (102).

The waveguide including the diffraction gratings (106, 108) comprising square wave profile gratings.

The waveguide including the diffraction gratings (106, 108) being made from titanium dioxide.

The waveguide including diffraction angles of the diffraction gratings (106, 108) being configured to be reduced along the length of the diffraction gratings (106, 108) to make the illumination exiting the waveguide uniform.

The waveguide including the waveguide being treated on at least one non-active surface of the waveguide to absorb illumination not directed to the exit point.

The waveguide including at least one non-active surface being painted black.

The waveguide including the illumination having multiple orders, and wherein at least one of the orders are absorbed by a treated non-active surface.

A display system comprising the waveguide according to another aspect of the invention.

A head-up display comprising the waveguide according to another aspect of the invention.

A head-worn display comprising the waveguide according to another aspect of the invention.

A method according to another aspect of the invention of operating a waveguide in an optical device, the method comprising: receiving, via an entrance pupil (102), image being directed into a prism (104); directing, via diffraction gratings (106, 108) illumination towards two semi-reflecting surfaces (114, 116) made formed by two make-up pieces (110, 112); partially reflecting the illumination, via the semi-reflecting surfaces out of the waveguide towards an eye-box (118).

The method including reflecting the illumination by total internal reflection within the prism (102).

The method including configuring the diffraction gratings (106, 108) to cause diffraction, via a structure of the diffraction grating within the waveguide such that an optical field is modulated in the prism (102).

A method of manufacturing a waveguide 100 according to another aspect of the invention comprising: forming a prism (104) forming an entry pupil (102) to the prism in a position that allows illumination to enter the prism via the eye pupil; forming diffractive gratings (106, 108) to the prism to enable transmission of illumination entering the prism; forming make-up pieces (110, 112) thereby forming semi-reflecting surfaces (114, 116); wherein the make-up pieces are position to direct a portion of the illumination to an exit point 118,

DESCRIPTION OF THE DRAWINGS

Embodiments of the invention will be described, by way of example, with reference to the following drawings, in which.

Figure 1:
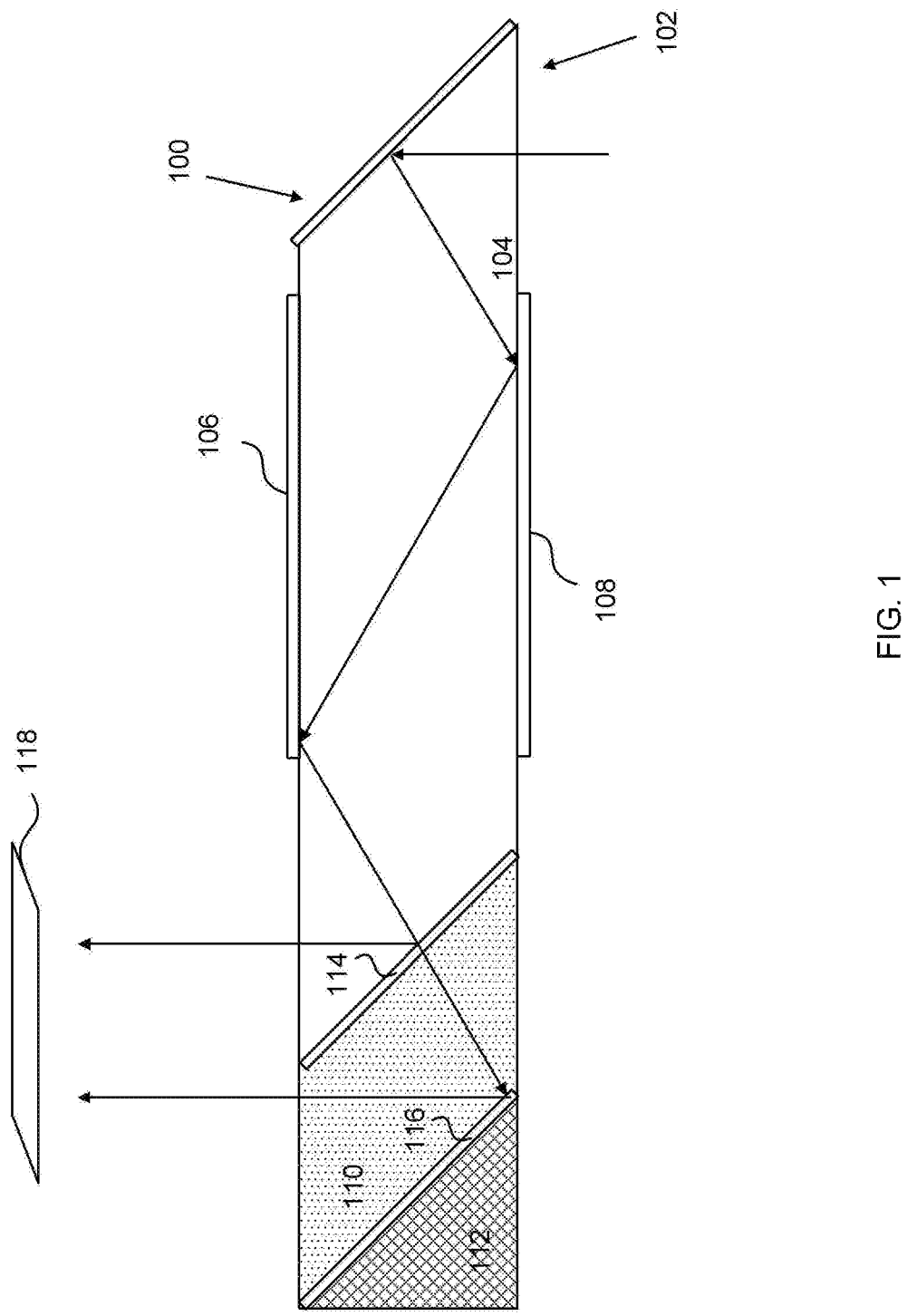
FIG. 1 is a schematic diagram of an example waveguide structure.

Common reference numerals are used throughout the figures to indicate similar features.

DESCRIPTION OF THE INVENTION

The present invention relates to incorporating diffractive processes (for example a grating) into a prismatic waveguide. The gratings may be simple and relatively inexpensive to manufacture. One possibility is to add a square wave grating which include a single layer of material without a blazed structure. Such gratings can be created by photolithography of a single layer coating. Because they only have a single layer of material, they do not have the directionality of current holograms, and diffract in several directions simultaneously. As a result, they generate ray paths that will divert light into bright ghost images which are then trapped through Total Internal Reflection (TIR) in the waveguide.

The basic method is to design a 1D prismatic waveguide that takes an input through an entrance pupil and reflects it off a semi-reflecting mirror surface. This changes the ray angles so that the light is trapped within the 1D main waveguide structure by TIR until the light intersects the semi-reflecting surface where a make-up piece is bonded to the main waveguide. In order to replicate the pupil, more than one make-up piece may be employed to create multiple pupils, to replicate the pupils over a larger eye box, so increasing the effective pupil size; but only in one direction. The pupil expansion in the other direction is obtained by coating one or both external surfaces on the 1D waveguide with a square wave grating structure. This is deliberately chosen to be square wave so as to be able to utilise photolithographic methods.

The choice of square wave gratings imposes a design consideration, namely that the gratings diffract light in more than one direction. These multiple directions are arranged to be trapped within the waveguide unless further diffraction restores the original direction. The waveguide is therefore designed as an integrated system design where three component elements combine. These include:

a prismatic 1D waveguide that traps the illumination inside the waveguide and expands the pupil in one direction; the waveguide comprising two or more pieces of glass that are cemented together;

a grating that diffracts and expands the pupil in the other direction, i.e. substantially perpendicular to the expansion direction in the prismatic 1D waveguide; and an eye-box where the eye sits, such that rays that are not fully contained within the waveguide may leak out and miss the eye-box, so being invisible to the observer.

The eye-box is part of the system design to improve the performance of the optical system as the parameters of the prismatic waveguide and the diffraction gratings may be compromised. This may cause illumination that otherwise might be trapped in the waveguide to leak out. By constraining the observer's eyes to be within the eye-box by the fit of the display on the head, the stray light is also constrained to paths that cannot be seen by the observer. The image bearing light enters the prismatic waveguide where the first reflection changes the ray angles, causing the illumination to be trapped by Total Internal Reflection (TIR). After diffraction, the ray angles increase, and are subject to further TIR. In order to regenerate the original ray angles, and hence the image, the rays have to re-interact with the gratings. If they were originally diffracted into the +1 order, then they will have to be diffracted into the −1 order to cancel the previous diffraction and restore the original 0 order ray directions.

The image may comprise an image of a scene or may include a computer generated image, such as symbology or the like. The image may further be obtained from any type of source depending on the nature of the device and required use.

The context of this invention is therefore that it is a hybrid 1D prismatic waveguide and orthogonal square wave gratings, using techniques that can be mass-produced. The invention may be expanded to fully diffractive waveguides where the prismatic waveguide is replaced by one containing diffraction gratings, but essentially in the same enhanced hybrid 1D arrangement. Alternatively, with a more general geometry, where two orthogonal square wave gratings replicate the pupil in two dimensions.

Referring to FIG. 1, a general optical layout of the waveguide 100 is illustrated. The waveguide includes an entrance pupil 102, a main prism 104, first and second diffraction grating 106 and 108, make up pieces 110 and 112, first and second semi-reflecting surfaces 114 and 116, and an eye-box 118.

The entrance pupil 102 is a constraining aperture in the optical system such that the illumination projected into the waveguide is only allowed through that aperture. It may comprise a hole in a shim placed over the waveguide, or it could be a virtual image of a stop in the projection optics. The entrance pupil is adapted for receiving an image, or light or illumination from a scene (not shown).

The main prism 104 of the waveguide comprises a prismatic 1D waveguide of glass, that first reflects the light from the entrance pupil into the glass. The light is trapped by TIR until it intersects a semi-reflecting surface.

The diffraction grating 106 and 108 comprise square wave profile gratings applied on the external surfaces, but coating the surfaces with a dielectric material that is of sufficient refractive index to create an optical field within the grating, even for incident ray angles that are beyond the TIR limit. The optical field is therefore modulated in space by the grating structure, thus causing diffraction within the waveguide. The grating material might be titanium dioxide or any other appropriate material.

The make-up pieces 110 and 112 are pieces of glass that are attached to the main prism. The make-up pieces may be cemented in place. They are coated with a suitable coating that acts with the optical properties of the cement to partially reflect the light that intersects them. A typical ratio might be 10% reflected out of the waveguide and 90% transmitted along the waveguide. It will be appreciated that different ration may apply for different uses.

The first semi-reflecting surface 114 is made by attaching the make-up pieces to the main prism. The first semi-reflecting surface reflects about 10% reflected out of the waveguide and 90% transmitted along the waveguide towards the second semi-reflecting surface 116.

The second semi-reflecting surface 116 interacts with the image transmitted by the first semi-reflecting surface 114 causing a second pupil to be reflected to the eye-box 116. This results in pupil replication and a larger illumination of the eye-box 118. The semi-reflecting surfaces may be formed by application of semi-mirrored layers between the main prism 104 and make up piece 110 and between make up pieces 110 and 112. In some cases, there is no specific reflective layer and the formation of the junction between pieces enable the creation of the semi-reflecting layer. This may be by choice of material or by virtue of the manner in which the pieces are connected together e.g., by the glue forming the joint.

The eye-box 118 is a hypothetical plane placed where the eye is positioned in the HMD design and is used to analyse the optical properties of the waveguide. Any illumination seen by a user, in use, should be the illumination that exits the waveguide in the position indicated by the eye-box. The eye-box is essentially defining an exit point for the illumination leaving the waveguide in normal use and to produce an output image for display to the user.

All the interactions occur in the near field distribution of optical flux, such that the ray angles in the far field overlap. By making the diffraction gratings and reflecting surfaces accurately parallel or orthogonal as appropriate, the far field alignment is assured.

Figure 2:
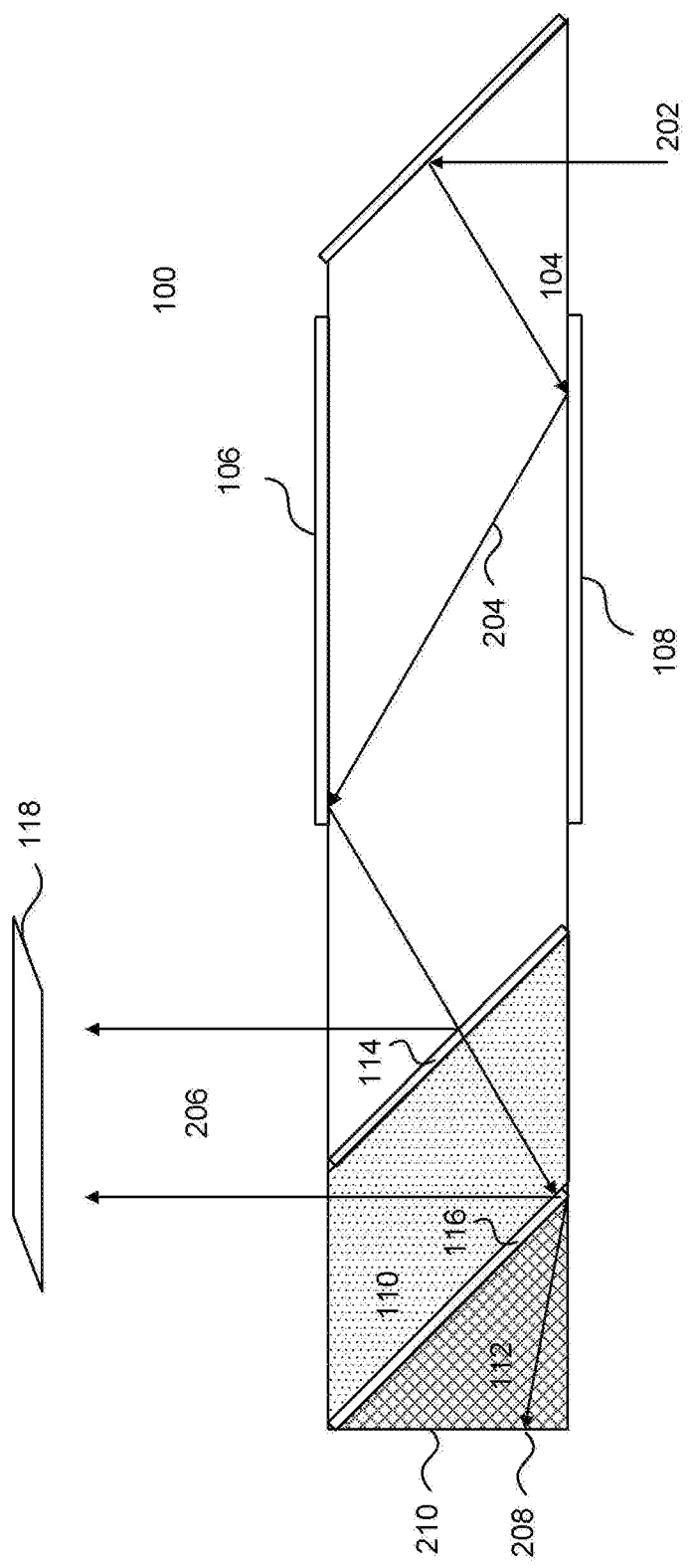
FIG. 2 is a schematic diagram of a ray trace.

Referring to FIG. 2, a nominal ray trace of the waveguide is illustrated. The term 'nominal ray trace' means the path of a ray that passes through without non-zero order diffraction, interacting with the waveguide only through refraction, reflection and zero order diffraction. In which case, a ray 200 enters the waveguide 100 through the entrance pupil 102 and reflects off a surface of the main prism marked 202. This reflection changes the ray angles to trap the light in the waveguide by TIR.

Since the ray 204 only experiences zero order diffraction, it will stay trapped in the waveguide until it reflects off the semi-reflecting surfaces 114 and 116 and the ray angles are changed back to their original values. The ray is no longer trapped by TIR and the ray 206 exits the waveguide towards the eye-box 118.

An additional ray path 208 may be generated that "strays" from the nominal ray trace, i.e. it is a stray light path. In the case of stray light path, the ray is directed to the edge of the waveguide 210, which is painted black to absorb the unwanted light. Any surface of the waveguide which is not configured to direct light from the entrance pupil to the eye-box can be treated to absorb light therefore preventing light from leaving the waveguide. As indicated above one example is to paint the surfaces black, but other method or substances can be used to prevent stray light escaping from the waveguide.

Figure 3:
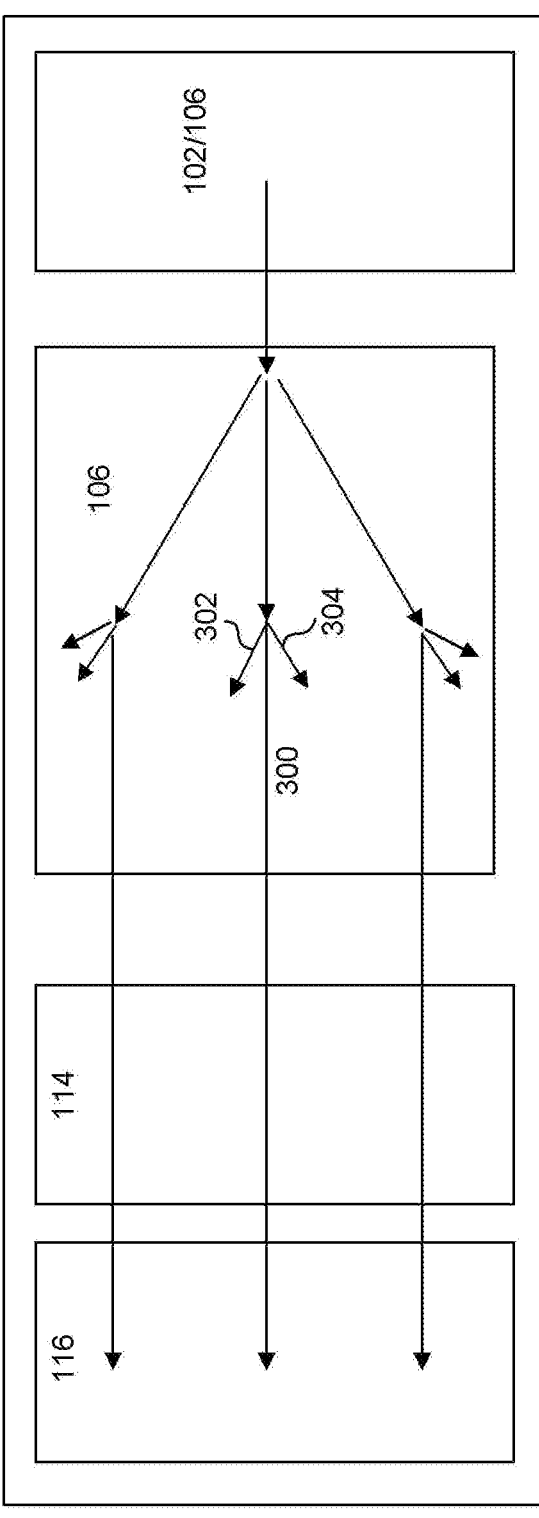
FIG. 3 is a schematic diagram from above showing different refractive orders and their progression through the waveguide structure.

Pupil replication and expansion is created by the additional ray paths as shown in FIG. 3. As before, the ray enters through the entrance pupil 102. When it intersects the diffraction grating 106 at, it splits into the zero order 300, the +1 order 302 and the −1 order 304. For clarity, the nomenclature of +/− is treated as arbitrary.

The +/−1 orders re-interact with the diffraction gratings 106 and 108, e.g. at 304; such that some light is diffracted back into the original zero order.

The semi-reflecting surfaces 114 and 116 reflect the reconstructed zero order (either the nominal path or reconstructed paths) out of the waveguide to the eye-box 118.

Managing stray light paths is implemented as follows. The properties of the diffraction gratings 106 and 108, in conjunction with the reflecting surfaces of the waveguide, act to cause the pupil to replicate and effectively expand. Part of the design process is to ensure that the resulting larger pupil has the best uniformity of flux per unit area. This causes trade-offs. The best design may deliberately allow stray light paths to enable better uniformity.

Figure 4:
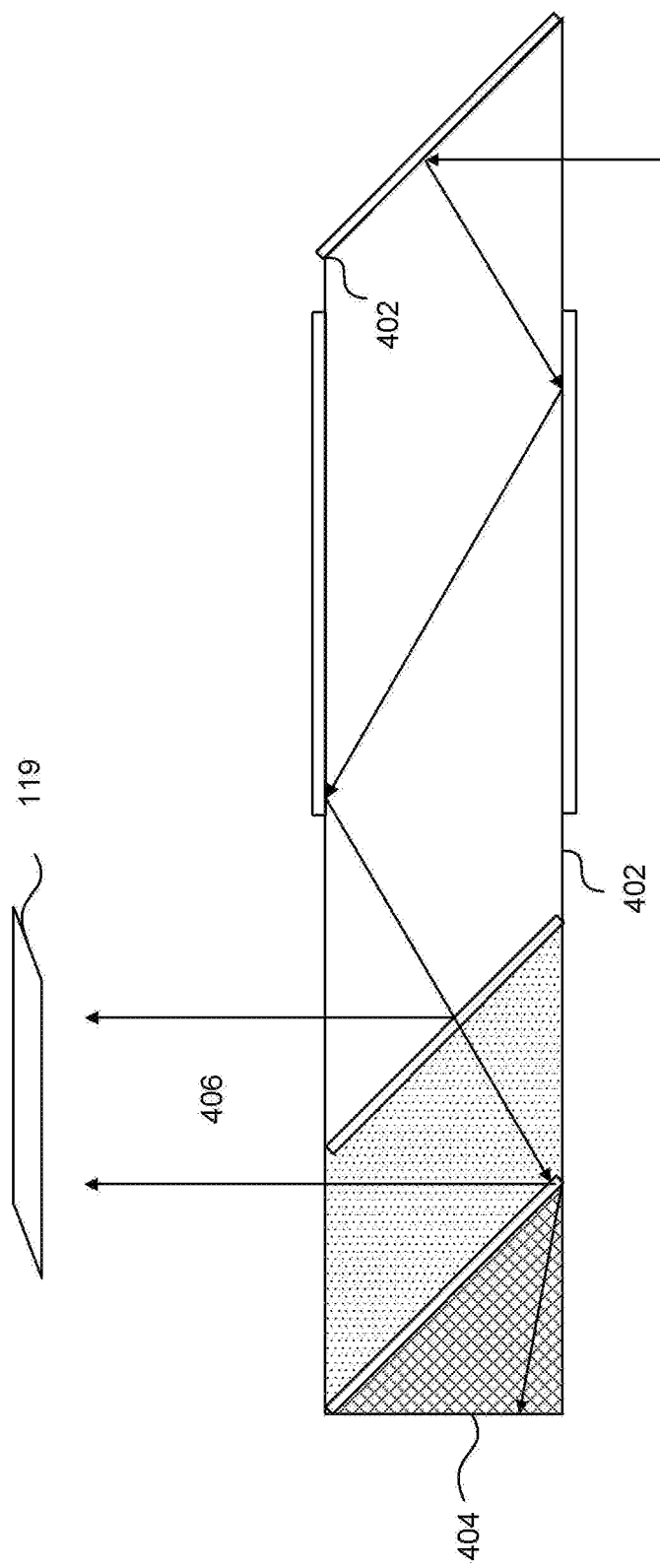
FIG. 4 is a schematic diagram of a concept for managing stray light paths.

The method by which stray light paths are managed as part of design trade-offs is illustrated by FIG. 4. When a full amount of diffraction is considered, the ray paths split into multiple rays as shown in FIG. 4. When the rays are subject to diffraction into multiple orders 400 at the diffraction gratings 106 and 108, they generate ray paths that must not be seen as stray light by the observer. This is because the light travelling along these angles will create ghost images. If those rays re-interact with gratings 106 and 108, they recreate the proper original zero order ray path; in which case the rays may be reflected to the eye-box 118 without constraint. However, if the rays leave the waveguide over different ray paths, then they must be suppressed. The following describes some methods for negating stray light.

In ray paths where the stray light passes to the edges of the waveguide 402, these edges are painted black and therefore absorb the light. Ray paths that avoid reflection at the semi-reflective surfaces are also absorbed by black end 404. In order to get better uniformity of the illumination 406 of the eye-box 118, it is advantageous to reduce the diffraction angles of the diffraction gratings 106 and 108, by widening the spacing between the grating lines. This allows the ray paths shown as 406 to be outside of the TIR limits after reflection from the semi-reflecting surfaces 114 and 116. The geometry of the waveguide is designed to direct these stray light paths (not shown) away from the eye-box 118. Because the HMD is designed for the observer's eye to be placed in the eye-box, this means that the stray light cannot be observed. Overall, the result of multiple re-interactions with the grating is that the pupil is replicated both vertically and horizontally.

The waveguide 100 can be used in the context of an HUD, HMD or any other type of optical device. The use is characterised by the light being directed from the entrance pupil 102 into the prism 104. The light is then directed by the diffraction grating 106 and 108 via total internally reflected towards the far end of the prism where two semi-reflecting surfaces 114 and 116 have been formed by two make-up pieces 110 and 112. At the semi-reflecting surfaces light is directed out of the waveguide towards the eye-box 118.

The waveguide 100 can be made as follows. A prism 104 is made having the required shape and size for the desired application. The prism is preferably made from glass. An entry pupil 102 is added to the prism in a position that allows light to enter the prism via the eye pupil. Diffractive gratings 106 and 108 are added to the waveguide. For example, on two different sides of the prism. Make-up pieces 110, 112 are added to the prism giving rise to semi-reflecting surfaces 114, 116. The make-up pieces are positioned to direct a portion of the light to an exit point 118 and are connected to the prism and each other by cement and/or a layer which causes partial reflection of light impinging thereon. Other surfaces of the waveguide may be treated to prevent stray light from escaping from the waveguide.

The invention achieves a number of advantages. The waveguide can be manufacturable in high volumes. The diffraction gratings are restricted to forms that can be reproduced by photolithography, because it is a symmetrical square wave grating without blazing. The prisms may be made by suitable jigging and flatwork polishing methods. The resultant waveguide is small and compact. The waveguide is reduced in length to suit the 1D design criteria associated with standards, such as QS2000. Hence it is easier to package in an HMD and may be suitable for future flight deck applications. The diffractive process is much more controllable as there is no need for blazing and the photolithographic process is more reproducible than replication methods. As a result, costs are reduced and quality improved.

The waveguide described above can be used in any appropriates device including but not limited to HMDs, HWD, heads up devices (HUD), head down devices (HDDs)

and the like. The invention includes such a device having a waveguide as described therein. In addition, the device and waveguide can be separate and form a kit of parts including the device and the waveguide.

Whilst the invention has been described with respect to the illumination being light (i.e. normal optical spectrum), it will be appreciated that the waveguide could be used with different wavelengths outside the optical spectrum.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A waveguide for use in display system, the waveguide comprising:
   a one-dimensional prism having an entrance pupil for receiving first order illumination of an image into the one-dimensional prism, the first order illumination received via the entrance pupil being trapped within the one-dimensional prism by total internal reflection (TIR) towards first and second semi-reflecting surfaces; and
   a plurality of square wave diffraction gratings applied on opposing external surfaces of the one-dimensional prism, wherein
      a first one of the plurality of square wave diffraction gratings is configured to diffract the first order illumination of the image trapped within the one-dimensional prism by further TIR into second and third orders towards the first and second semi-reflecting surfaces, and
      a second one of the plurality of square wave diffraction gratings is configured to diffract the second and third order illumination back into the first order;
   wherein the first and second semi-reflecting surfaces each reflect the first order illumination towards an eye-box to produce an output image.

2. The waveguide according to claim 1, wherein the first semi-reflecting surface is formed at a junction between the prism and a make-up piece.

3. The waveguide according to claim 2, wherein the make-up piece is a first make-up piece, and the second semi-reflecting surface is formed at a junction between the first make-up piece and a second make-up piece.

4. The waveguide according to claim 3, wherein the first and second make-up pieces are cemented in place.

5. The waveguide according to claim 4, wherein the cement causes the first and second semi-reflecting surfaces to reflect the illumination.

6. The waveguide according to claim 5, wherein first and second make-up pieces are coated with a coating that reacts with the cement to cause the reflection.

7. The waveguide according to claim 1, wherein the first and second semi-reflecting surfaces are configured to reflect about 10% of the illumination and transmit about 90% along the waveguide.

8. The waveguide according to claim 1, wherein the square wave diffraction gratings comprise a structure that is configured to cause diffraction within the waveguide such that an optical field is modulated in the prism.

9. The waveguide according to claim 1, wherein the square wave diffraction gratings are made from titanium dioxide.

10. The waveguide according to claim 1, wherein square wave diffraction angles of the diffraction gratings are reduced along the length of the diffraction gratings to make illumination exiting the waveguide uniform.

11. The waveguide according to claim 1, wherein the waveguide is treated on at least one non-active surface of the waveguide to absorb illumination not directed to the exit point.

12. A display system comprising the waveguide according to claim 1.

13. A head-up display comprising the waveguide according to claim 1.

14. A head-worn display comprising the waveguide according to claim 1.

15. A method of transmitting illumination via a waveguide in an optical device, the waveguide comprising:
   a one-dimensional prism having an entrance pupil for receiving first order illumination of an image into the one-dimensional prism, the first order illumination received via the entrance pupil being trapped within the one-dimensional prism by total internal reflection (TIR) towards first and second semi-reflecting surfaces; and
   a plurality of square wave diffraction gratings applied on opposing external surfaces of the one-dimensional prism, wherein
      a first one of the plurality of square wave diffraction gratings is configured to diffract the first order illumination of the image trapped within the one-dimensional prism by further TIR into second and third orders towards the first and second semi-reflecting surfaces, and
      a second one of the plurality of square wave diffraction gratings is configured to diffract the second and third order illumination back into the first order;
   wherein the first and second semi-reflecting surfaces each reflect the first order illumination towards an eye-box to produce an output image,
   wherein the method comprises:
   receiving, via the entrance pupil, the image being directed into the one-dimensional prism;
   directing, via the square wave diffraction gratings, the illumination of the image towards the first and second semi-reflecting surfaces formed by two make-up pieces; and
   partially reflecting the illumination, via the first and second semi-reflecting surfaces, out of the one-dimensional prism towards the eye-box.

16. The method of claim 15, further comprising reflecting the illumination by total internal reflection within the one-dimensional prism.

17. The method of claim 15, further comprising causing diffraction, via the square wave diffraction gratings, such that an optical field is modulated in the one-dimensional prism.

18. A method of manufacturing a waveguide, the method comprising:

forming a one-dimensional prism having an entrance pupil for receiving first order illumination of an image into the one-dimensional prism, the first order illumination received via the entrance pupil being trapped within the one-dimensional prism by total internal reflection (TIR) towards first and second semi-reflecting surfaces;

forming a plurality of square wave diffractive gratings on opposing external surfaces of the one-dimensional prism to enable transmission of illumination entering the one-dimensional prism, wherein a first one of the plurality of square wave diffraction gratings is configured to diffract the first order illumination of the image trapped within the one-dimensional prism by further TIR into second and third orders towards the first and second semi-reflecting surfaces, and a second one of the plurality of square wave diffraction gratings is configured to diffract the second and third order illumination back into the first order;

forming make-up pieces thereby forming the first and second semi-reflecting surfaces; and wherein the make-up pieces are positioned to direct the first order illumination to an eye-box to produce an output image.

\* \* \* \* \*